Dec. 10, 1963   HISAYOSHI KUBODERA   3,113,696
DEVICE FOR LIMITING MOVEMENT OF KETTLE HANDLES AND THE LIKE
Filed July 27, 1961

United States Patent Office 3,113,696
Patented Dec. 10, 1963

3,113,696
DEVICE FOR LIMITING MOVEMENT OF KETTLE HANDLES AND THE LIKE
Hisayoshi Kubodera, 6, 2-chome, Ichigaya-Kaga-cho, Shinjyuku-ku, Tokyo-to, Japan
Filed July 27, 1961, Ser. No. 127,303
1 Claim. (Cl. 220—96)

This invention relates to a device for limiting the free movement of kettle handles and the like.

In the conventional kettles, the rotatable handle is liable to be brought in contact with the main body of the kettle and become over-heated, thus causing inconvenience in grasping the handle and possibly damaging the material covering the handle. Of course, for the purpose of eliminating the above disadvantages, a projection and a perforated hole may be provided, respectively, at bracket and handle end portion. However, the projection is liable to be broken, and the material composing the end portion of the handle will be weakened by the perforated hole. Furthermore, the rotatable range of the handle from the center vertical position toward the rightside and leftside is narrowed by the existence of the perforated hole, whereby handle handling becomes inconvenient, and the volume of the kettle becomes too large for packaging. Moreover, in the conventional kettle, it is possible to lock the handle in only one of the rightward and leftward positions.

An object of this invention is to eliminate the above-mentioned disadvantages by providing a special device for limiting the rotation of the handle.

The novel features of the present invention will be apparent from the following detailed description, when taken together with the accompanying drawings, in which the same and equivalent members are indicated by the same references and numerals, and in which.

Figure 1:
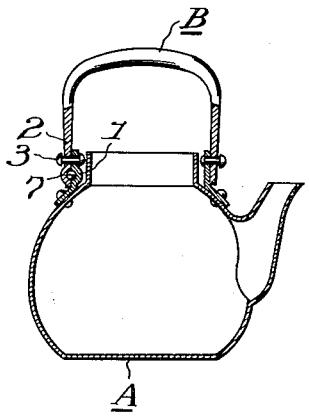
FIG. 1 is a side elevational view, in section, of a kettle to which one embodiment of this invention is applied.
Figure 2:
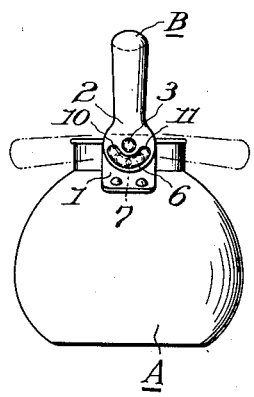
FIG. 2 is a rear elevational view of the kettle of FIG. 1, for showing the stopped positions of the handle.
Figure 3:
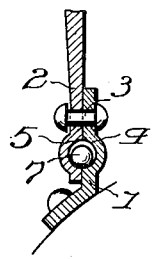
FIG. 3 is a sectional elevational view of the device of this invention.

Referring to FIGS. 1 and 2 the kettle consists of a main body A, brackets 1 attached to the main body A at opposite sides, and a handle B, end portions 2 of said handle B being rotatably connected to the said brackets 1 by pins 3. The bracket 1 and one end portion 2 to be attached thereto are, respectively, provided with arcuate concave surfaces 4 and 5 which are formed by pressing to form a cavity 6, said arcuate concave surfaces being closely faced to each other and positioned along a circle with its center at the pin 3. A ball 7 is inserted in said cavity so as to be moved therein.

In the embodiment of FIGS. 1 and 2, said cavity is provided at only one end portion of the handle, but the cavity 6 may be provided at both end portions 2 of handle B. Both ends 8 and 9 of the concave surface 4 of the bracket 1 and both ends 10 and 11 of the concave surface 5 of the end portion 2 may be formed to be straight with the same effect instead of being formed in semicircular form as illustrated in FIGS. 1–6.

In embodying this invention, the illustrated ball 7 may be replaced by a piece forming a part of a ring having a circular section and the same radius as the radius of the arc of the arcuate cavity 6.

Furthermore, the concave surfaces 4 and 5 can be formed to have, respectively, isosceles triangle having a vertex angle of 90° so as to form a cavity 6 having a square section. In this case, the ball 7 is replaced by a piece forming a part of a ring having a square section and the same radius as that of the arc of the cavity 6.

The operation of the device of this invention will be described as follows.

Figure 4:
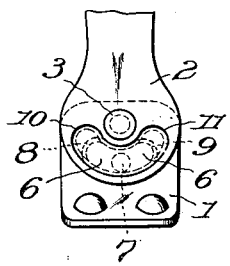
FIG. 4 is a front elevational view of the device of FIG. 3.
Figure 5:
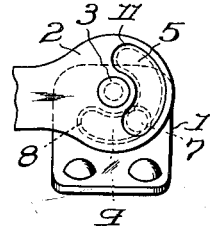
FIGS. 5 and 6 are the same views as the one of FIG. 4, but showing, respectively, the case in which the handle is turned leftward and stopped and the case in which the handle is turned rightward and stopped.

When the handle B is turned leftward from the upright state of FIG. 4, the left end 10 of the concave surface 5 pushes the ball 7 rightward in the cavity 6, but when, as shown in FIG. 5, the ball 7 contacts the right end 9 of the concave surface 4 and is stopped thereby, the leftward turning of the handle is stopped. On the other hand, when the handle is turned rightward from the upright state of FIG. 4, the right end 11 of the concave surface 5 pushes the ball 7 leftward, but when, as shown in FIG. 6, the ball 7 contacts the left end 8 of the concave surface 4 and is stopped thereby, the rightward turning of the handle is stopped.

Figure 6:
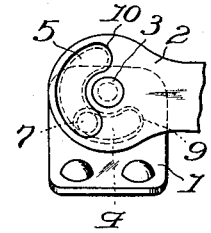

As will be understood from FIGS. 5 and 6, the arcuate length of the path through which the concave surface 5 passes corresponds to sum of arcuate length of the path of the ball 7 in the concave surface 4 and arcuate length of the path of the ball in the concave surface 5. Accordingly, even when the arc lengths of the concave surfaces 4 and 5 are relatively short, the rotatable angle of the handle can be increased.

The arc lengths of the concave surfaces can be lengthened as desired, so that rotatable angle of the handle can be remarkably increased, for example, if desirable, to an angle over 360°. Accordingly, the turning angle of the handle can be determined as desired by suitable selection of arc lengths of the concave surfaces 4 and 5.

The device of this invention, can be operated more easily than the conventional devices for limiting the rotation of the handle. Furthermore, in the conventional device provided with a projection or projections for limiting the rotation of the handle, the user's finger or other material may be caught between said projection and bracket. Moreover, these projections are subject to contamination by dirt and dust, thus creating poor design style and producing an unsanitary kettle. In contrast, the device of this invention can be adapted to present an esthetic appearance and is not contaminated by dirt and dust and is sanitary. Further, since the device of this invention necessitates no means except the concave surfaces made by pressing, the strength of handle structure is not weakened.

What I claim is:

In combination, a tea kettle of the type having a freely swinging curved handle with the ends thereof pivotally connected to spaced apart brackets fixed to the upper part of the kettle body, a first arcuate concave recess on one of said brackets concentric with the pivot axis of said handle, a second arcuate concave recess on the end of said handle pivotally connected to said one bracket, said second arcuate recess being concentric with said pivot axis and confronting said first recess to define an arcuate cavity, each of said arcuate recesses being less than 360° and having the ends thereof defined by end walls extending generally in an axial direction, and a stopping member captured within said cavity and freely slidable therein between said end walls, said stopping member cooperating with one end wall of said first arcuate recess and the non-corresponding end wall of said second arcuate recess to limit pivotal movement of the handle in one direction with the handle spaced from the kettle body, said stopping member cooperating with the remaining pair of end walls to limit pivotal movement of the handle in the other direction with the handle spaced from the kettle body.

References Cited in the file of this patent

UNITED STATES PATENTS

| | | |
|---|---|---|
| 234,227 | Booth | Nov. 9, 1880 |
| 2,048,725 | Bartimore | July 28, 1936 |
| 2,162,650 | Stephens | June 13, 1939 |
| 3,009,187 | Barba et al. | Nov. 21, 1961 |

FOREIGN PATENTS

| | | |
|---|---|---|
| 270,100 | Great Britain | May 5, 1927 |